Figure 7:
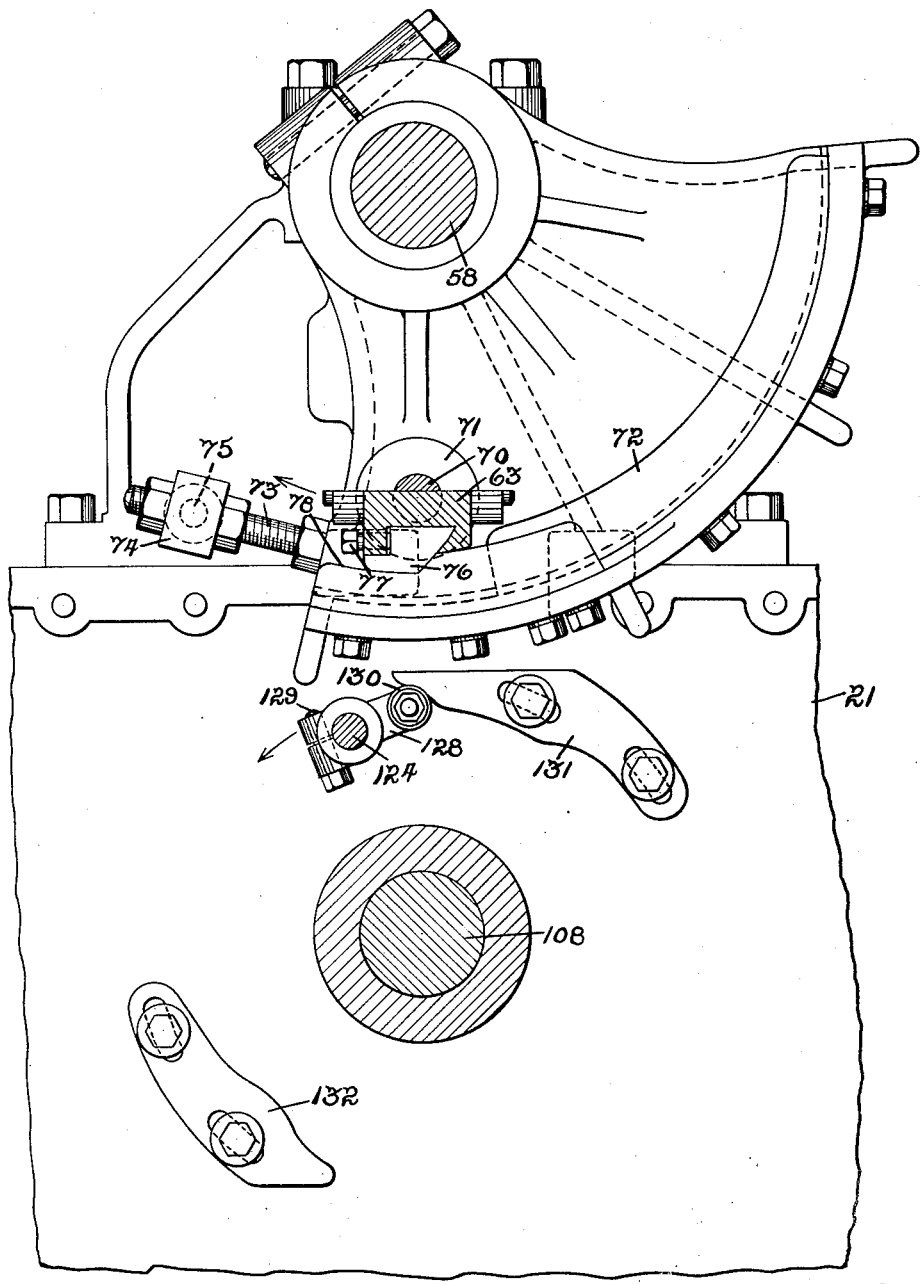

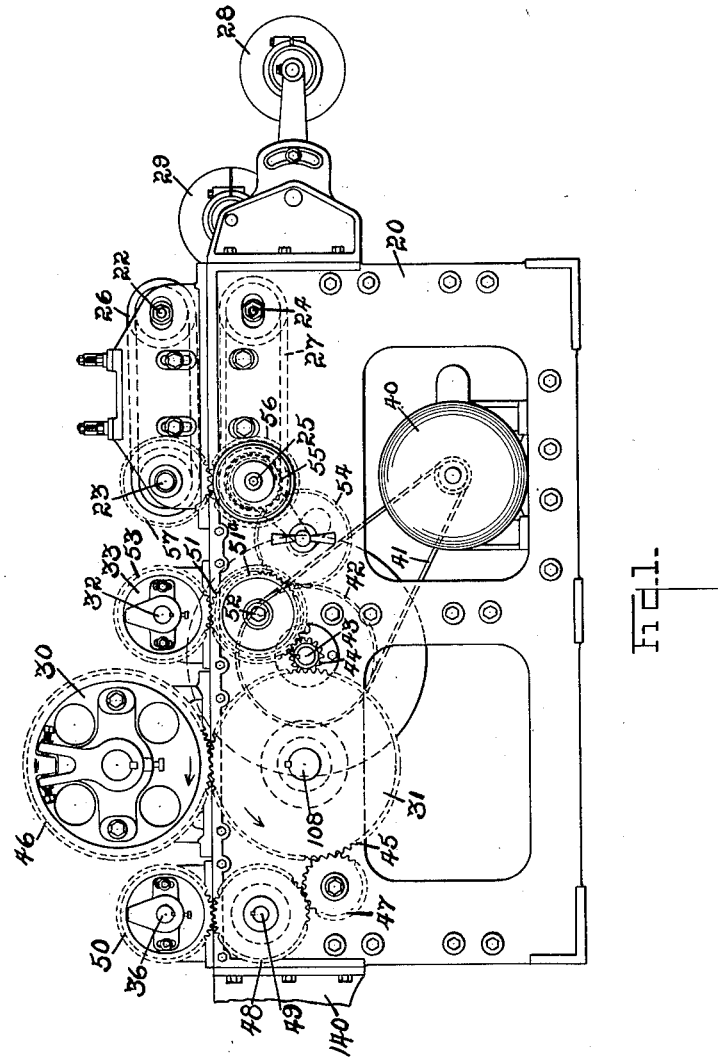

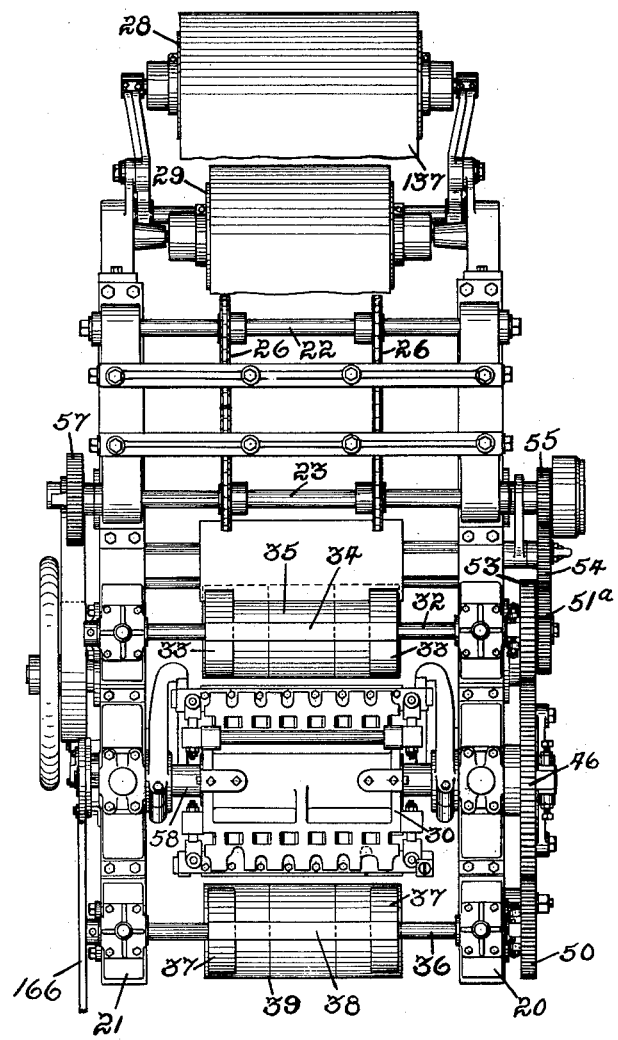

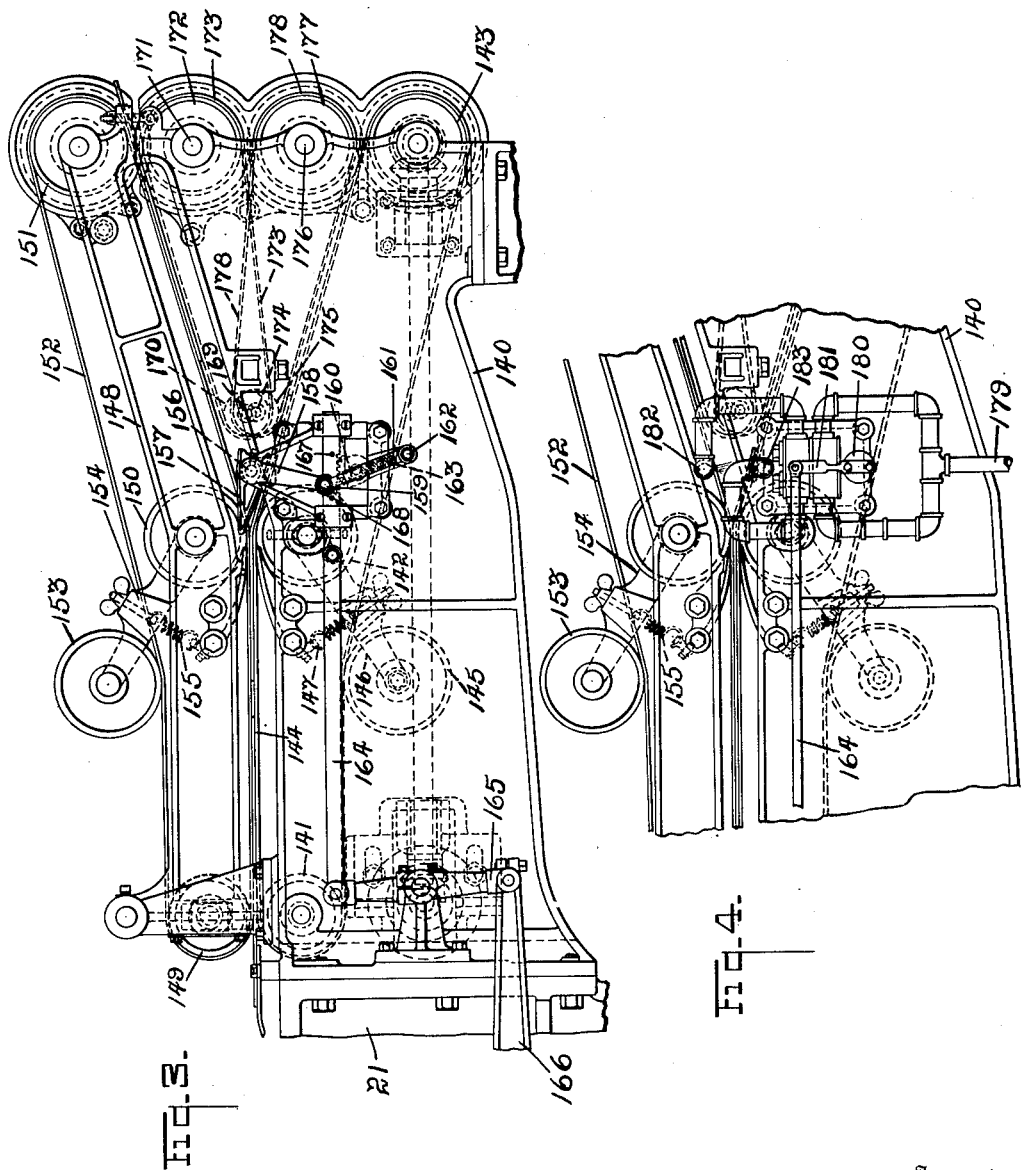

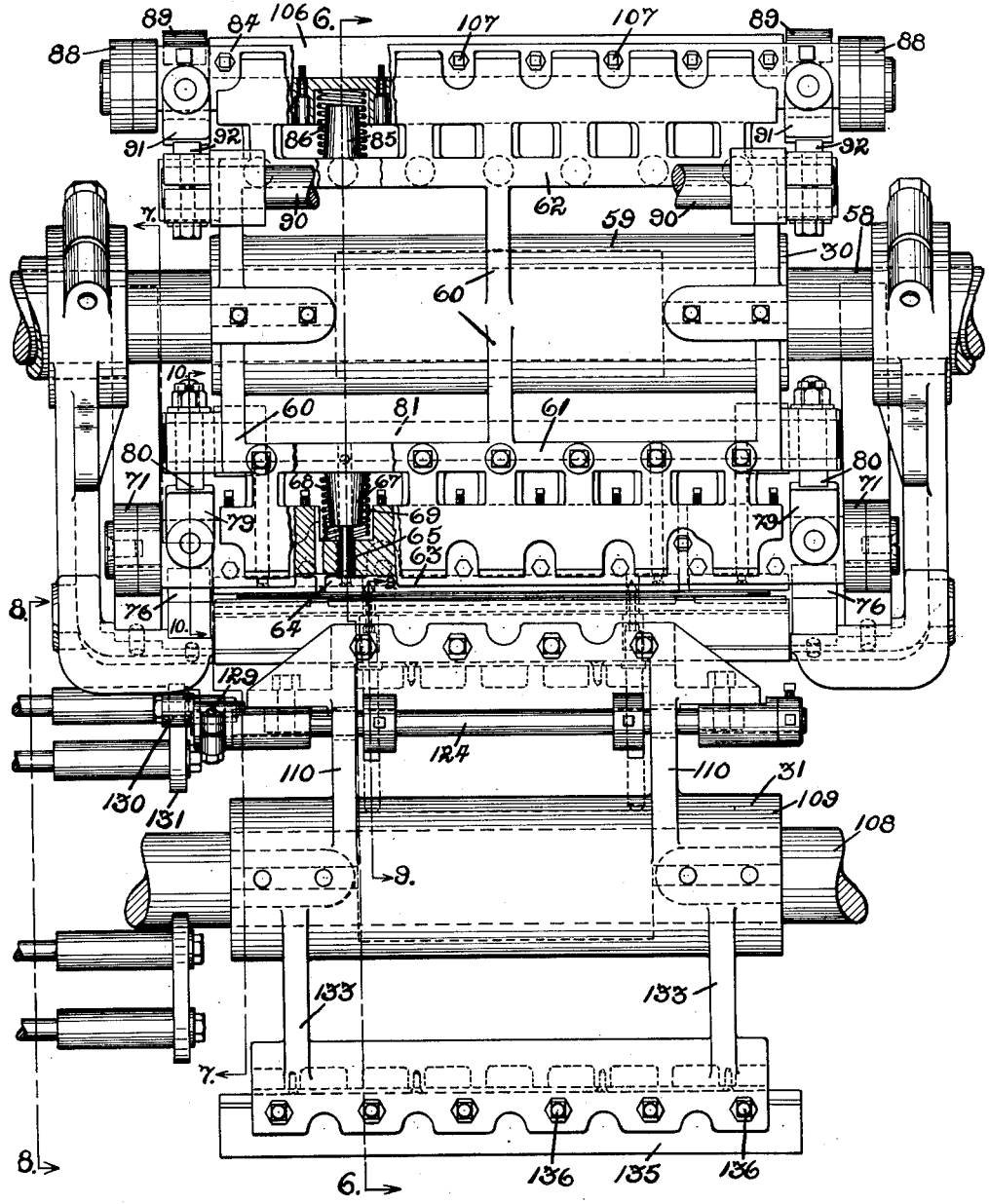

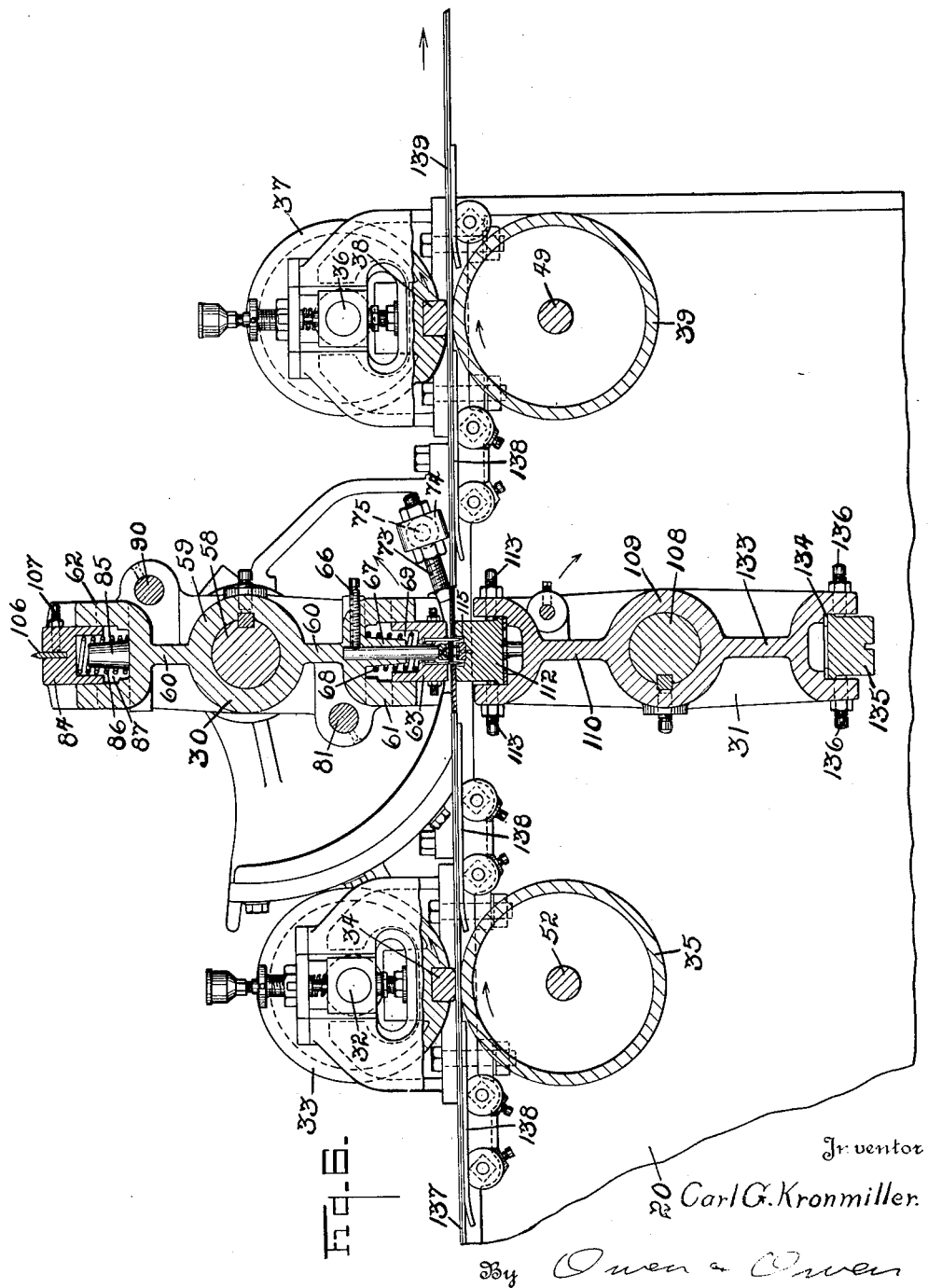

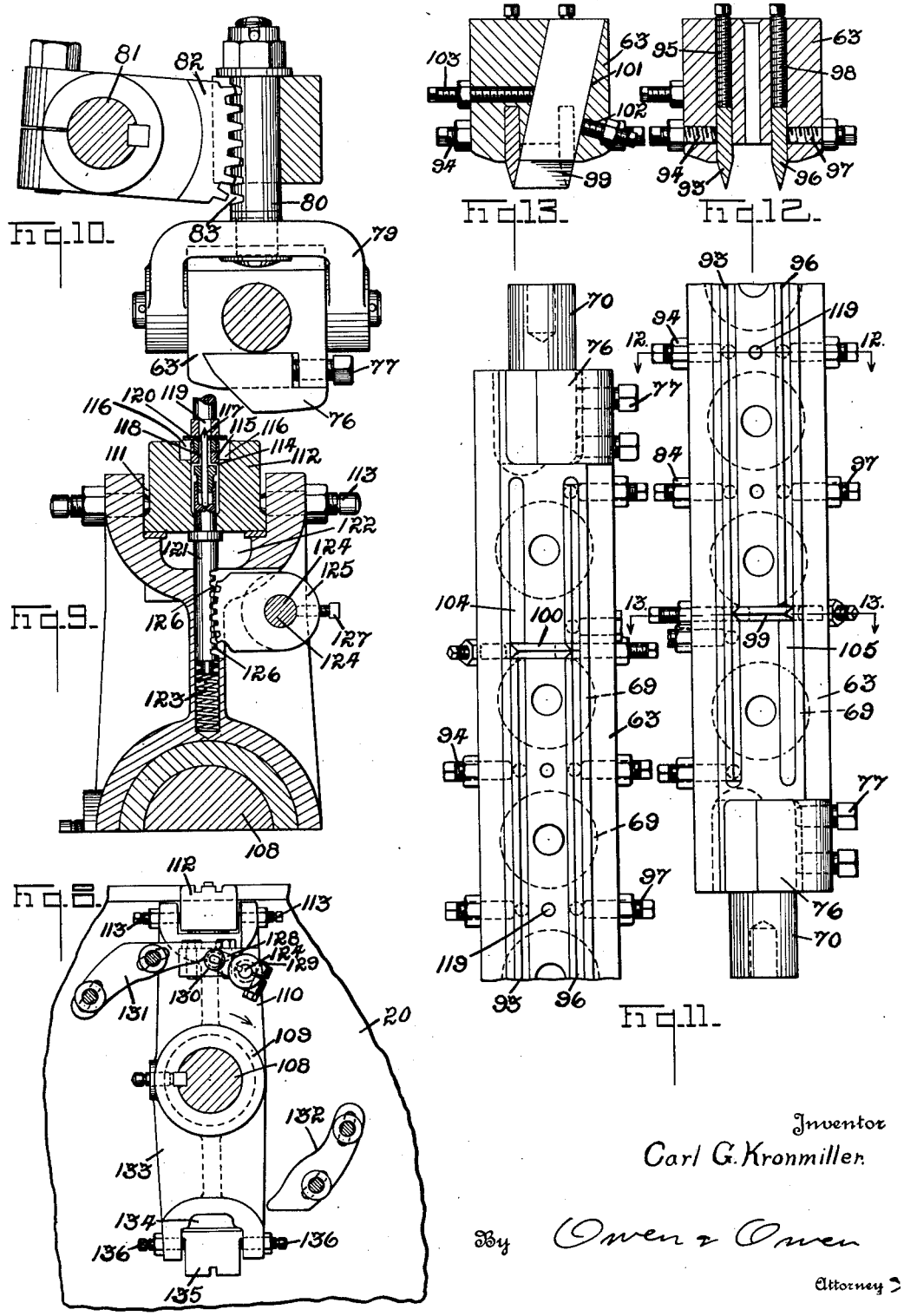

Patented Sept. 29, 1931

1,825,405

UNITED STATES PATENT OFFICE

CARL G. KRONMILLER, OF CHICAGO, ILLINOIS, ASSIGNOR, BY MESNE ASSIGNMENTS, TO ST. REGIS PAPER COMPANY, OF NEW YORK, N. Y., A CORPORATION OF NEW YORK

CUTTING AND DELIVERY APPARATUS FOR BAG LENGTHS

Application filed November 7, 1927. Serial No. 231,507.

My invention relates to apparatus for severing successive bag lengths from a continuous paper tube, said lengths having extensions differently arranged on alternate lengths, and for delivering the lengths having similarly arranged extensions in the same position.

The object of my invention is to provide apparatus which will rapidly and automatically sever a continuous tube of paper into bag lengths having proper extensions to form valves for bags and separate the lengths so that those having similarly arranged extensions will be assembled together. Details and other objects of the invention and the improvements by which they are attained will appear as the description proceeds.

In the accompanying drawings forming a part of this specification, Figure 1 is a side elevation of the receiving and cutting portion of the apparatus, with parts broken away; Fig. 2 is a plan view of that portion of the apparatus shown in Fig. 1; Fig. 3 is a side elevation of the delivering portion of the apparatus; Fig. 4 is a view of a variation of a portion of the delivering device; Fig. 5 is a view of the cutter-carrying roll and co-operating roll, parts being broken out; Figs. 6, 7, 8 and 9 are sections on the lines 6—6, 7—7, 8—8 and 9—9, respectively, of Fig. 5; Fig. 10 is a detail view of the operating means for the cutter bar taken on line 10—10 of Fig. 5; Fig. 11 is a plan view of the cutter bar; Figs. 12 and 13 are sections on lines 12—12, 13—13, respectively, of Fig. 11.

The apparatus herein disclosed is mounted upon two side frames 20 and 21 connected by suitable cross bars. Mounted in bearings in these frames there are shafts 22, 23, 24 and 25 for operating feed chains 26 and 27, which operate to draw the paper tube over guide rolls 28 and 29 from any suitable source.

The cutting apparatus comprises a cutter roller 30 and abutment carrying roller 31, a shaft 32, operating discs 33, which carry a retarding gripper bar 34 mating with an abutment roller 35, a shaft 36, and an operating disc 37 carrying an adjusting gripper bar 38 adapted to mate with an abutment roller 39. The machine is operated by a motor 40 connected by a belt 41 or other suitable means to a drive pulley 42 on a shaft 43. Shaft 43 carries a gear 44 in mesh with a gear 45 which drives the roller 31. Gear 45 meshes with gear 46 on cutter roller 30 and also with an idler gear 47, which in turn meshes with a gear 48 on shaft 49 carrying, loosely mounted thereon, abutment cylinder 39. Gear 48 meshes with a gear 50 on shaft 36.

Gear 44 likewise meshes with a gear 51 on shaft 52 carrying, loosely mounted thereon, abutment roller 35. Gear 51 meshes with a gear 53 on shaft 32. The speed of shafts 49 and 52 is such as to give the rollers mounted thereon approximately the peripheral speed of the fabric moving thereover without slippage on the shaft, any slight difference between the speed of the pinch bars and the normal speed of the abutment rollers being taken care of by slippage of the rollers on their shafts.

An idler gear 54 meshes with a gear 51ª on shaft 52 and with a gear 55 on shaft 25. Another gear 56 on shaft 25 meshes with a gear 57 on shaft 23.

From the above arrangement of gearing it will be clear that the various shafts are all driven in timed relation from motor 40.

The cutter roller comprises a shaft 58 on which there is mounted a sleeve 59 having arms 60 carrying guides 61 and 62. Mounted in guide 61 there is a double knife cutter bar 63. Within the cutter bar there is a fixed clamp bar 64 carried by pins 65 and held in position by set screws 66.

Around pins 65 there are provided cone-shaped projections 67 which hold in place springs 68, which springs enter sockets 69 in cutter bar 63.

On each end of bar 63 there is a roller stud 70 carrying a roller 71 adapted to run upon a cam 72. Cam 72 is fixed to a bracket pivotally mounted upon shaft 58 and adjustable about shaft 58 by means of screw 73 passing through a head 74 mounted upon a pin 75 fixed in the frame.

At each end the cutter bar adjacent the cam roller previously described, there is a hardened slide-block 76 held in position in the block by means of a set screw 77. A block having an abutment surface 78 is mounted on the support of cam 72 for co-operation with block 76.

Each end of bar 63 is provided with a yoke 79 having a stem 80 slidable in a lug upon arms 60. A rock-shaft 81 is mounted in suitable bearings on arms 60, and is provided with segment gears 82 adapted to mesh with teeth 83 on stems 80. By this means the two ends of bar 63 are compelled to operate in unison.

In guide 62 on arm 60 there is a bar 84 adapted to carry a single cutting knife. Mounted upon the guide 62 there are conical projections 85 surrounded by springs 86 entering sockets 87 in bar 84. Each end of bar 84 is provided with a cam roller 88 and slide-block 89. There is a rock shaft 90 parallel with the bar 84, which is related to yokes 91 on bar 84 having stems 92 in the same way that shaft 81 is related to the yoke 79 and stems 80.

As shown in detailed Figs. 11 and 13, bar 63 carries a left-hand knife 93 clamped in position by screws 94 and adjustable inward or outward by means of screws 95. Bar 63 also carries a right-hand knife 96 clamped in position by screws 97 and adjustable inward or outward by screws 98. Cutter bar 63 is likewise provided with slitter-knives 99 and 100. Each slitter-knife is positioned in a slot 101 and held in position by screws 102 and 103. Knives 93 and 96 are received in slots 104 and 105 in cutter bar 63, but each one stops at one end at the slitter-knife and so does not extend to the end of the slot.

Cutter bar 64 is provided with a single knife 106 held in position by a set screw 107.

The abutment roller co-operating with the cutter bars comprises a shaft 108 carrying a sleeve 109 from which there extend arms 110 provided with sockets 111 for a grooved bar 112 held in said sockets by screws 113. Bar 112 is provided with a channel 114, in which there is fixed a bar 115 leaving grooves 116 between the sides of the bar and the sides of the channel for the reception of knives 93 and 96 when the grooved bar and cutter bar are brought into co-operating cutting relation.

Spears 117 pass through holes 118 in member 115 and through holes 119 in member 64. When so extended, the spears pass through a section of paper 120 which is cut from the tube by the arrangement of knives above described in the bar 63.

Each spear 117 is carried by a plunger 121 operating in a socket 122 in arm 110. The plungers are normally thrust outward by springs 123 in said sockets. Parallel with shaft 108 there is a rock shaft 124. On shaft 124 there are segmental gears 125 meshing with teeth 126 in spear plungers 121. Each segmental gear is held in adjusted position on shaft 124 by means of a set screw 127.

Shaft 124 is provided with an actuating arm 128 clamped in position on the arm by means of bolt 129. Arm 128 carries a roller 130 in position to contact with a cam 131, and with a spear-retracting cam 132 during the revolution of the roller, cam 131 first retracting the spear plungers as they approach a vertical position, and then releasing them to be shot upward as they reach the vertical position.

Extending in the opposite direction from arms 110 there are arms 133 provided with sockets 134 for receiving a bar 135 held in adjusted position by set screws 136. Bar 135 is provided with a single groove for co-operation with knife 106.

In the operation of the device a paper tube 137 is fed into the machine and is guided from one of the described devices to the next means of intermediate supports 138. This tube is cut off into successive bag lengths 139.

On each side of the delivery end of the apparatus there is a side frame 140, suitably supported in any desired manner. At the receiving end of this frame there is a series of pulleys 141, and in line with these pulleys there is a series 142 near the middle of the frame and a series 142 at the delivery end of the frame. A series of belts 144 pass around these pulleys. As will be seen, the receiving portions of these belts are substantially horizontal, while the delivery portions are directed downward. A series of pulleys 145 mounted on lever 146 drawn upward by springs 147 contact the lower runs of the belts and act as belt tighteners.

On each side of the apparatus, above frames 140, there are frames 148, carrying pulleys 149 at the receiving end, a series of pulleys 150 near the middle, and a series of pulleys 151 at the delivery end, corresponding to pulleys 141, 142 and 143. Belts 152 pass around these upper pulleys and are arranged vertically above belts 144. A series of pulleys 153 rest upon the upper runs of belts 152 and act as belt tighteners, being mounted on levers 154 drawn upward by springs 155.

Mounted in the point of the V between the spreading delivery ends of belts 144 and 152 there is a rock shaft 156 carrying deflector fingers 157. Preferably these deflector fingers are arranged one on each side of the apparatus outside of the outer belts 144 and 152, and one between each pair of belts 144 and 152.

Rock shaft 156 is provided with an arm 158 pivoted at 159 to a plunger 160 which works in a sleeve 161 pivoted to the frame at 162. A spring 163 in sleeve 161 presses against plunger 160.

A horizontally arranged slide bar 164 is connected to a lever 165 actuated by a bar 166 connected to the driving means of the cutter so as to be reciprocated once for each revolution of the cutter carrier. Slide bar 164 carries two pins 167 and 168 in position to contact pivot 159.

Mounted in frame 140 to the right of rock shaft 156, as shown in Fig. 3, and slightly thereabove, there is a shaft 169 carrying pulleys 170, and at the delivery end of the frame there is a shaft 171 carrying pulleys 172. A series of belts 173 pass over pulleys 170 and 172. A shaft 174 is mounted directly beneath shaft 169 and carries pulleys 175, while a shaft 176 carrying pulley 177 is mounted beneath shaft 171. A series of belts 178 pass over pulleys 175 and 177. Belts 173 and 178 are preferably each approximately one-half the width of belts 144 and 152, and are offset, so that the upper divider belts 173 will each contact a bag beneath one-half of the corresponding upper delivery belt 152, while the corresponding lower divider belt will contact a bag above the other half of the corresponding lower delivery belt 144.

In Fig. 4 there is shown an alternative device which may be used in place of dividing fingers 157 and their operating mechanism. In this construction there is a air pipe 179 for delivering compressed air to a valve 180 having a stem 181 operated by a sleeve bar 164. The valve is constructed to deliver compressed air alternatively to a pipe 182 having a series of delivery nozzles above the path of the delivered bags, and to a pipe 183 having a series of delivery nozzles beneath the run of the delivered bags.

Having described the construction of one form of apparatus embodying my invention, the method of operation will be briefly set forth. It will be understood that a continuous paper tube is received from any suitable source of supply, either directly as it is formed, or after it has been stored, as preferred.

In either case, the rate of movement of the tube is governed by the speed of movement of feeding chains 26 and 27. The shafts carrying the gripper bars rotate at twice the speed of the shafts carrying the cutter bars and abutment bars, so that the gripper bars come in contact with the tube each time a cutter bar operates. Preferably, the gripper bar on the receiving side of the cutter is arranged to move at slightly less speed than the receiving chains, so that the tube is slightly retarded when gripped by this bar, and there is a tendency to produce a limited amount of slack between this gripper bar and the receiving chains. On the other hand, the gripper bar on the delivery side of the cutter is preferably arranged to move slightly faster than the receiving chains, so that there is a positive tightening or stretching of the length of tubing being cut. The cutting knives are intended to move at the same speed as the receiving chains. These relative speeds are secured, of course, by having bar 34 less than one-half as far from its axis as the axis of the cutter roller 30 is from the material cut, while bar 38 is distant from its axis more than one-half the distance the axis of the cutter roller is from the material cut. The result is that when a cut is made, the length on the receiving side is held back temporarily by the pinch bar on that side while the length on the delivery side is pulled forward by the gripping bar on that side, and, therefore, the ends of the two lengths are pulled apart and freed from the knives.

When the double knife cutter operates, a rectangular portion between the two long knives and the short cross knives is severed from the tube. It will be readily understood that the spears mounted within the grooved bar are thrust into this rectangular portion of paper and carry it with the grooved bar until the spears are retracted by contact with cam 132, whereupon the paper is discharged.

The actual cutting is done by means of springs forcing the cutter bars outward. The cutter bars are forced inward by the rollers on the ends of the cutter bars riding upon the fixed cams co-operating therewith. Just before the cutting position is reached the rollers run off their cams and the hardened blocks of the bar rest upon the abutting surfaces arranged therefor. Immediately thereafter these abutment plates slide downward off of the notch on their supporting cam, as will be clearly understood from Fig. 8. By this construction the cam rollers are relieved from the jar incident to stopping the bars at the ends of the cutting stroke. At the same time the arrangement of parallel bar with segments geared to the stems of yokes on the ends of the cutter bar compel both ends of the bar to move at the same speed, so that there is no lagging of one end of the bar even though the paper should furnish more resistance to cutting out one end than it does at the other. Also, due to this arrangement compelling the bar to move equally at both ends, the knives may be arranged at a slight angle to the horizontal, so that they do their cutting at one end slightly before the cutting at the other end is accomplished. In this way the maximum resistance to the springs is somewhat lessened, because the paper is not cut throughout the entire length of the cutting knives at the same instant, but there is a progressive cutting of the paper across the tube as the bar is driven outward.

After the tube is severed by this means, it will be evident that each alternate length will have a projection at one corner of its rear end, while the next length will have a projection at the other corner of its front end. In order to provide for convenient handling of the lengths during subsequent operations, it is desirable to have the lengths having similarly arranged extensions delivered together. The delivery devices as shown in Figs. 3 and 4 are devised for this purpose.

In the construction shown in Fig. 3 and with the deflecting fingers in the position in which they are shown in that figure, the cut off length is being deflected downward and delivered between belts 144 and belts 178 to any desired receiving means. The mechanism is so timed that when the gap between the cut off lengths is approached, bar 164 will move to the right sufficiently for pin 168 to straighten the toggle formed by arm 158 and members 160 and 161. The pin moves the knuckle of this toggle slightly beyond the straightened position. Thereafter spring 163 tends to throw the toggle to its extreme right position and thereby depress the fingers, and in the normal operation of the machine this action results, the fingers thus passing beneath the oncoming end of the next length and deflecting it upward between belts 173 and 152. If for any reason the severance has not been completed, the fingers are pressed downward so lightly with the toggle nearly straightened that no serious interference with the delivery of the bags results, and the next length is delivered downward with the length ahead of it to which it is still attached. But if the severance is sufficient to allow the fingers to move downward materially beyond the point where the toggle is straightened, the effect of the spring increases and the fingers are moved quite positively to the limit of their downward movement and deflect the oncoming length upward.

It will be readily understood that after a length has been deflected upward the slide bar is moved back to the left and pin 167 contacts the knuckle of the toggle, and the fingers are deflected upward in the same way as described for their downward deflection.

In the construction shown in Fig. 4, the same results of dividing successive lengths, when they are fully severed, without clogging the machine when severance has been defective for any reason, is achieved by alternate air pressure from above and beneath, as will be readily understood.

From the above it will be readily seen that successive lengths are delivered alternately upward and downward, and may be received and carried away in any desired manner. In my co-pending application, Serial No. 189,547, for bag conveyor, filed May 7, 1927, there is shown an off-bearing belt which is suitable for bearing off the discharged length from the severing device described above. Two of these belts may be arranged, one above the other, to receive the cut-off lengths as they are delivered alternately from the upper and lower belts of the described dividing delivery mechanism.

It will be readily understood that various changes may be made in the described mechanism within the scope of the appended claims.

What I claim is:

1. In apparatus for severing a strip of fabric, means for moving the fabric at a predetermined speed, means for moving a cutter at the same speed as that of the fabric, means for gripping the fabric on the receiving side of the cutter, means for moving said gripper during the cutting operation at a speed slightly slower than that of the cutter, a gripper on the discharging side of the cutter, and means for moving the last said gripper during the cutting operation at a speed greater than that of the cutter.

2. In apparatus for severing sheets of fabric, means for moving a sheet through the apparatus, a cutter, means to move the cutter with the fabric while cutting the same, a gripping bar and means to rotate the gripping bar into and out of contact with the fabric, a shaft on the side of the fabric opposite the gripping bar, and a roller mounted loosely upon said shaft and acting as an abutment against which the gripping bar may press the fabric.

3. In apparatus for severing sheets of fabric, means for moving a sheet through the apparatus, a cutter, means to move the cutter with the fabric while cutting the same, a gripping bar and means to rotate the gripping bar into and out of contact with the fabric, a shaft on the side of the fabric opposite the gripping bar, a roller mounted loosely upon said shaft and acting as an abutment against which the gripping bar may press the fabric, and means to turn the shaft at a speed approximately equal to the speed necessary to turn the roller mounted thereon at a peripheral speed equal to that of the fabric.

4. In apparatus for cutting sheets of fabric, a rotating cutter carrier having a radial slideway therein, a cutter bar mounted in said slideway, means adjacent one end of the bar and acting directly thereon to move the bar in the slideway, a shaft mounted adjacent the slideway, and gear teeth mounted on the shaft and meshing with teeth at each end of the bar, whereby the movement of the two ends of the bar is equal and simultaneous.

5. In apparatus for cutting sheets of fabric, a rotating cutter carrier having a radial slideway therein, a cutter bar mounted in said slideway, a cam adjacent one end of said carrier and adapted to engage said cutter bar and move it in such slideway, a shaft mounted in the carrier adjacent and parallel to the slideway and means connecting the ends of the bar to the shaft for rocking the shaft when the bar moves in the slideway, whereby the shaft and connections compel the two ends of the bar to move equally and simultaneously.

6. In apparatus for cutting bag tubes into bag lengths, means for severing successive lengths with corner extensions on each successive length differently directed, means for delivering the cut-off lengths from the apparatus, and means for deflecting the lengths so that every other one of the successive lengths is deflected upward and every other one of the lengths deflected downward, said deflecting means being automatically inoperative when the cut between the successive lengths is defective and remaining inoperative during the passage of two successive lengths before automatically resuming its deflecting action.

7. In apparatus for cutting bag tubes into bag lengths, means for severing successive lengths with corner extensions on each successive length differently directed, means for delivering the cut-off lengths from the apparatus, means for deflecting the lengths so that every other one of the successive lengths is deflected upward and every other one of the lengths deflected downward, said deflecting means comprising a member adapted to deflect a cut length in one direction, to pass through the space between said length and the next length, and deflect said next length in the opposite direction, means connected with the cutter for moving said member in timed relation with the cuts, and a yielding connection between said member and its moving means.

8. In apparatus for cutting bag tubes into bag lengths, means for severing successive lengths with corner extensions on each successive length differently directed, means for delivering the cut-off lengths from the apparatus, means for deflecting the lengths so that every other one of the successive lengths is deflected upward and every other one of the lengths deflected downward, said deflecting means comprising an oscillatable deflector pivoted substantially in the path of the cut-off lengths, a member connected to the cutting device to be oscillated through one complete oscillation in the time that two cuts are made, and a yielding connection between the member and deflector whereby the deflector is oscillated to deflect successive lengths in opposite directions when cut apart, but when deflecting motion of the deflector is resisted, the deflector remains upon the same side of the path of the lengths while two more lengths are moved past and is then again automatically operated to deflect, providing the cut is perfect.

In testimony whereof, I have hereunto signed my name to this specification.

CARL G. KRONMILLER.